March 25, 1930.  J. F. PATTERSON  1,752,197
STORAGE TANK
Filed April 27, 1929  3 Sheets-Sheet 1

INVENTOR:
John F. Patterson,
BY Parker Cook.
ATTORNEY.

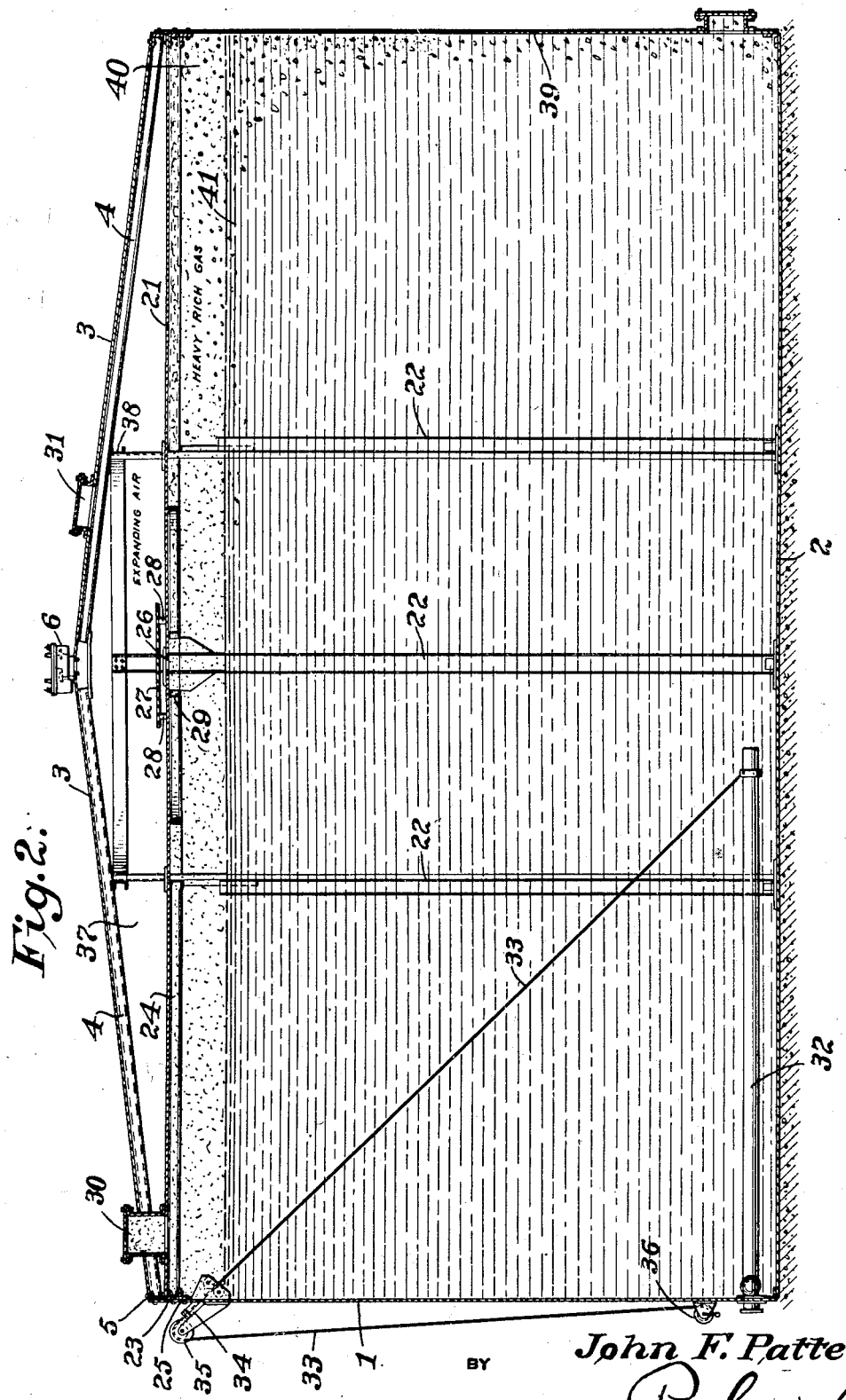

March 25, 1930. J. F. PATTERSON 1,752,197
STORAGE TANK
Filed April 27, 1929 3 Sheets-Sheet 3
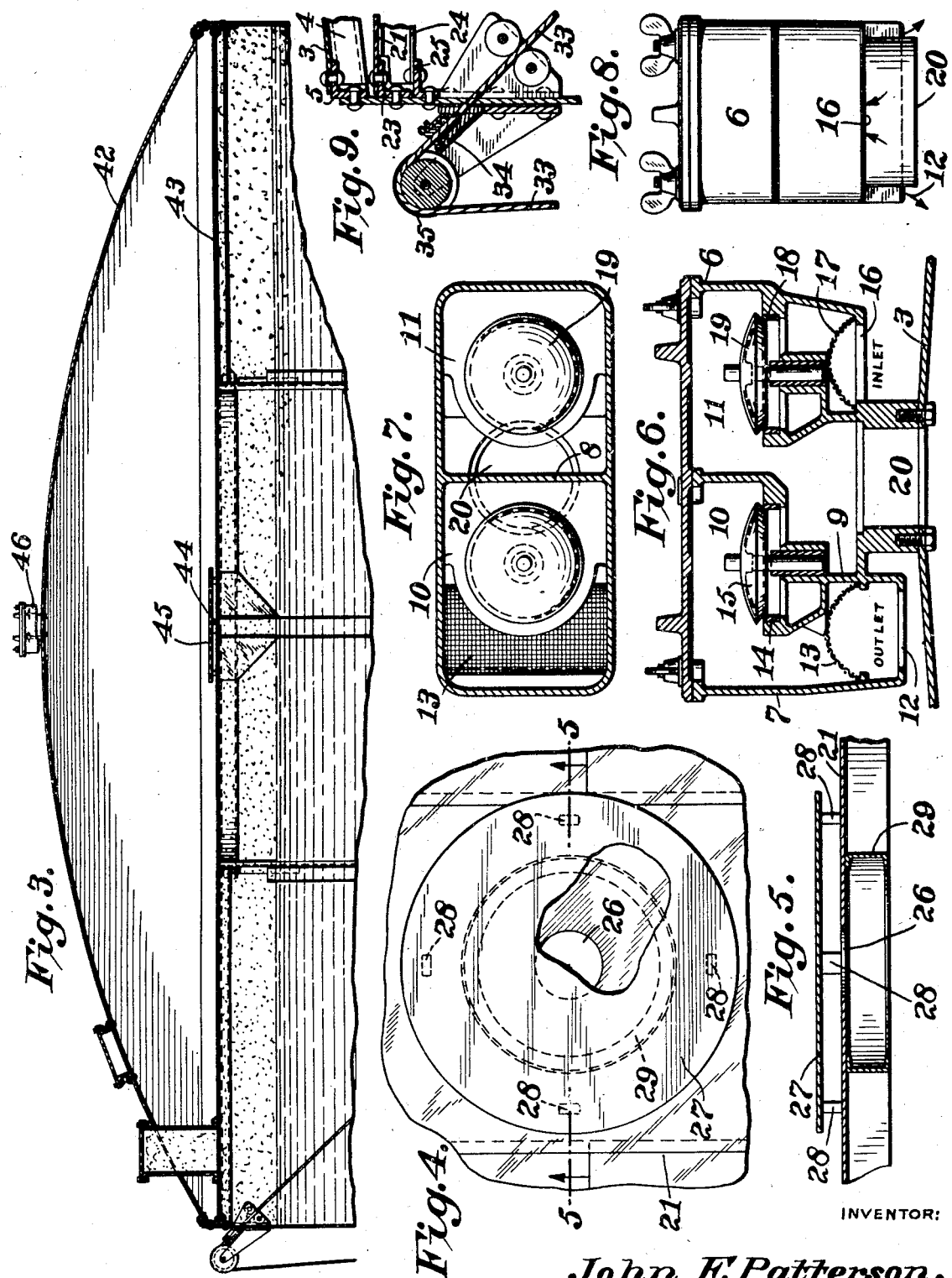
INVENTOR:
John F. Patterson,
BY Parker Cook
ATTORNEY.

Patented Mar. 25, 1930

1,752,197

UNITED STATES PATENT OFFICE

JOHN F. PATTERSON, OF WARREN, OHIO, ASSIGNOR TO THE WARREN CITY TANK & BOILER COMPANY, OF WARREN, OHIO, A CORPORATION OF OHIO

STORAGE TANK

Application filed April 27, 1929. Serial No. 358,639.

My invention relates to new and useful improvements in storage tanks, and more especially to tanks for the storage of light liquids, such as naphtha, gasoline, crude petroleum and the like, and has for an object to provide a tank that will prevent loss by evaporation of the liquid from the storage tank.

As is well known to those skilled in the art, the loss by evaporation from storage tanks containing these light liquids is a factor that has to be considered, as the loss may be a considerable one, especially if the tank is used in hot climates.

The loss by evaporation is due principally to the breathing action set up by alternate heating and cooling of the gas vapors enclosed in the tank.

During the daytime, the sunshine on the tank heats the vapors and expands them and some of this vapor is forced out through the relief valve. During the nighttime, the vapor in the tank is cooled down and as the fresh air is drawn into the tank, and is cooler than the air within the tank, the cool air tends to settle to the bottom, and thus creates a circulation, mixing the air and vapor.

The next time the vapor within the tank becomes heated and expands, there is a pressure created above that set by the relief valve and more vapor is thus expelled.

This loss is in proportion to the temperature rise and is considerable during the hot months of the summer or, if the tank is used in the southern part of this country or in foreign countries where the climate is hot, the loss of vapor by evaporation is considerable.

Another object of the invention, therefore, is to provide a tank where this loss can be greatly reduced and consists of placing a sealing deck or sub roof within the tank and in certain spaced relation to the roof, so that the heavy vapors will be held beneath this deck while the expanding air above the deck and below the roof may be passed out through the conservation valve.

Still another object of the invention is to provide a means for preventing the evaporation in storage tanks and the means in itself being easily constructed and relatively cheaply manufactured.

Still another object of the invention is to provide a tank wherein the part for preventing the evaporation does not in any way interfere with the use of the accessories usually provided and, at the same time, is capable of quick fabrication.

With these and other objects in view, the invention consists in certain new and novel arrangements and combination of parts, as will be hereinafter more fully described and pointed out in the claims.

Referring now to the drawings showing a preferred embodiment of the invention and a slight modification—

Fig. 2 is a vertical sectional view showing the deck or sub roof for preventing the loss of the vapors by evaporation;

Fig. 3 shows a slight modification in that the outer roof is of dome shape rather than cone shape as shown in the preferred form;

Fig. 4 is a top plan view of the center portion of the deck, the baffle being broken away for the sake of clearness;

Fig. 5 is a sectional view taken on the line 5—5 of Fig. 4;

Fig. 6 is a sectional view of a conventional form of conservation vent valve;

Fig. 7 is a top plan section of the same;

Fig. 8 is a side elevation thereof;

Fig. 9 is a fragmentary detail view showing the roof, deck and means for elevating the outlet pipe.

Figure 1:
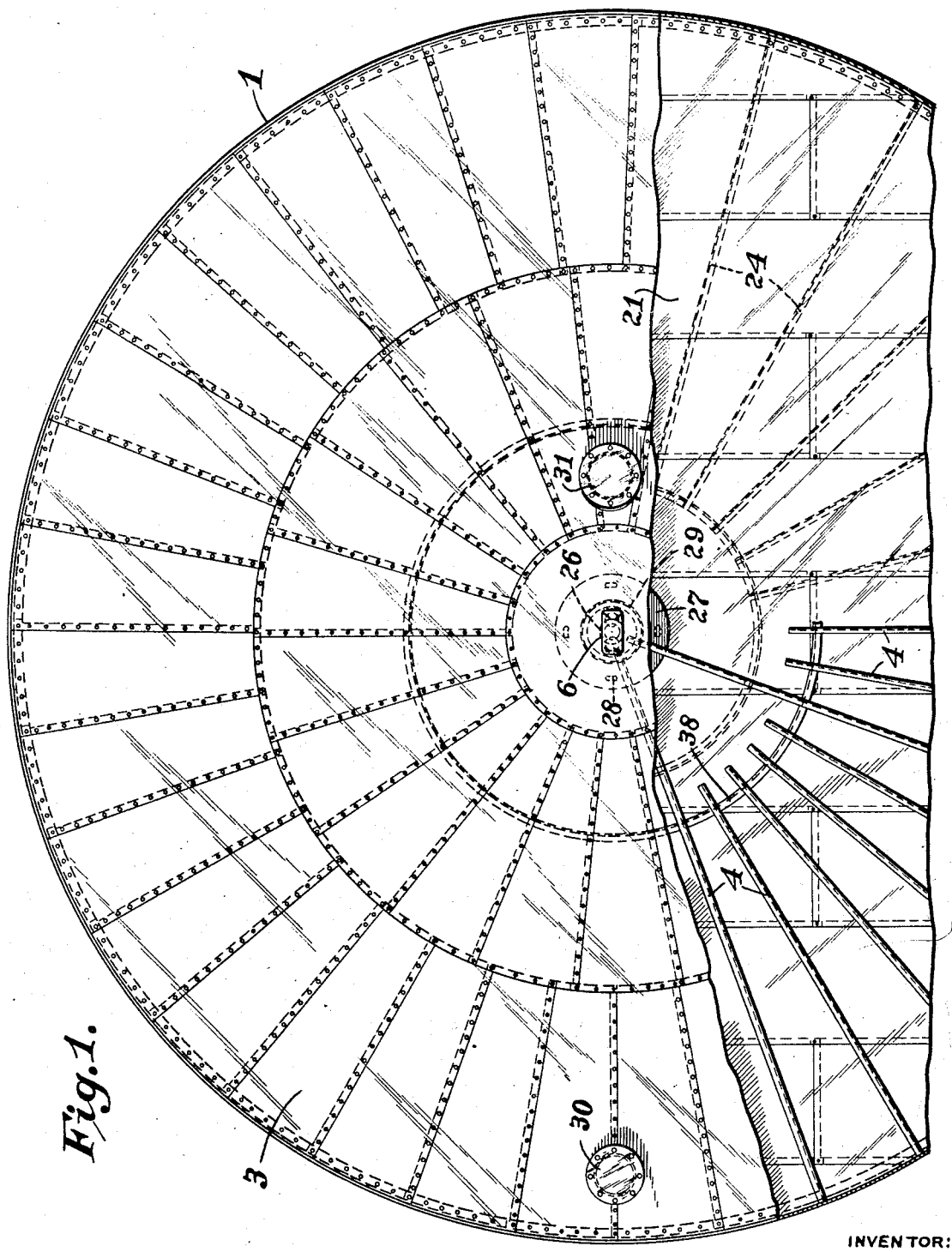
Fig. 1 is a top plan view of my improved tank, a part of the roof being broken away for the sake of clearness.

Referring now more particularly to the several views and to Figs. 1 and 2 for the moment, there is shown a storage tank comprising the usual side walls 1, the bottom 2 and the roof 3. These side walls and bottom of the tank are to be constructed of sheet steel and riveted together, as is the usual form of these large storage tanks.

Now, as may be seen in Fig. 1, the roof 3 is supported by a plurality of radial rafters 4, which extend up to the central portion of the roof. These rafters may be securely riveted to a top rail angle iron 5 which is riveted around the upper edges of the side walls of the tank. At the top and centrally of this roof is placed the usual form of conservation vent valve 6 and although this valve per se does not form part of the invention, it has been illustrated and a few words of description will follow. It is to be understood, however, that any form of conservation vent valve might just as well be used with my structure.

Referring for the moment to Figs. 6, 7 and 8, the housing of the valve 6 is divided by the wall 8 and the lower wall 9 to form the two compartments 10 and 11.

In the lower end of the compartment 10, there is the opening 12 and screen 13, also the valve seat 14 with its valve 15. In a like manner, in the compartment 11, there is the inlet 16, screen 17, valve seat 18, and the valve 19. The main inlet to this conservation valve, that is from the tank, is at 20 which leads directly into the chamber 11. The valve 19 is an inlet valve operated by vacuum created in the tank by the cooling of the air and the other valve 15 is a pressure valve, so that when pressure builds up from expansion of the air in the tank, it may escape through the outlet 12.

As before mentioned, these pressure and vacuum valves or, as they are known, conservation vent valves are in use today on a number of tanks, but instead of just the air escaping from the ordinary form of tank, the vapors or the air mixed with the vapors, due to evaporation of the liquid in the tank, escape, and in some instances, this loss is a considerable one.

Referring now to the gist of the invention, there will be seen what I call a deck or sub roof 21, which is also formed of sheet metal and extends completely over the tank and completely seals the same with the exception of one small opening, which will be shortly explained.

This steel deck or sub roof is to be properly supported by columns 22 that extend to the bottom of the tank, while the peripheral edge is to be secured to the angle irons 23, as may be seen in Fig. 9.

There are also provided a number of channel rafters 24 for supporting the deck, and these rafters are supported by the peripheral angular braces 25, as may be seen in Fig. 9.

It will be understood that a sub roof or deck might be constructed in any other preferred manner, the idea being that this sub roof or deck is rigid and strong and does not in any way move or rise and fall with the liquids in the tank, which latter is true of tanks with the ordinary floating decks.

As mentioned before, however, and as may be seen in Fig. 5, this deck 21 has a central opening 26, which may be about twelve inches in diameter, while positioned about five inches above the opening is a baffle plate 27, which is fastened by the small posts 28. The metal directly about this opening 26 may be braced, as at 29. Now, this is the only opening through the sub roof, that is a normal opening, there being, however, a manhole 30 into the tank which is always sealed, and in the same way in the upper or roof proper 3, there is a manhole 31 which is normally closed.

In Fig. 2, there is shown the outlet pipe 32 which is connected at its inner end by a cable 33 that passes out through a small opening 34 and over the sheave 35 and will be operated by movement of a windlass 36.

By forming this sub roof 21 as shown, there is formed an air expansion chamber 37 between the sub roof and the roof proper.

It might be mentioned here that circular channel beams 38 supported by the columns 22 may be secured under the peak of the roof 3 to rigidly support the same, though any other form of bracing might be used.

Now, as far as the invention has been explained, it will be seen that the tank comprises not only the regular roof 3 with the relief valves at its highest point, which are set to function at a low pressure, but also is provided with another sub roof or deck which is near the top of the tank and is provided with the opening at its center.

It might be further mentioned that the size of this center opening is in proportion with the tank inlet and outlet and it is the only opening communicating with the chamber between the two decks. Over this opening is the baffle plate. Furthermore, the chamber 37 should have a volume somewhat greater than the maximum volume of air forced out from the tank during the process of breathing.

Now, as the deck, together with the circular opening and baffle plate, prevents diffusion, the air that is forced out when the same expands will be nearly free from gasoline vapor.

Supposing the sun is shining on one side of the tank, any gasoline vaporized by the heat on the sunny side 39 of the tank will rise along the shell and escape into the space, which I have designated at 40, that is, the space between the level 41 of the liquid in the tank and the under surface of the deck 21.

It is well known that this vapor is from two and one-half to three and one-half times heavier than air and it will remain in the space and not diffuse with the air above the sub roof or deck within the chamber 27.

It will be understood that the liquid level will always be lower than the level of the sub-roof or deck 21 and these vapor gases will tend to stay below the tank sub roof and not pass into the chamber 37 which will be filled at times with the expanding air.

Of course, when the tank is first filled, some of the vapor will be forced into the space between the two decks, but due to the breathing action, this vapor will be expelled and after this, only air drawn into the tank through the vacuum valve will be forced out.

In Fig. 3, I have shown a slight modification, the only difference being that the roof proper 42 is of the dome type rather than of the form shown in Fig. 2. The tank will have the same sub roof or sub deck 43 and the opening 44 and the baffle plate 45 and in a like manner, the conservation vent valve 46.

From the foregoing, it will be seen that I have provided a tank that is not only suitable for northern latitudes, but is especially valuable for use in countries having a hot climate or hot season and gasoline may be stored for long periods of time in a tank of this form without any appreciable loss by evaporation.

Many slight changes might be made without in any way departing from the spirit and scope of the invention.

Having thus described my invention, what I claim as new and desire to secure by Letters Patent is:

1. A storage tank for volatile hydrocarbons comprising side walls and a bottom, a roof on said tank, and a deck secured near the upper edge of the side walls, said deck having one opening therein, a baffle plate above said opening, the space between the deck and the roof forming a chamber for expanding air, and conservation vent valves in the roof proper.

2. A storage tank for liquids comprising a body portion and a roof, a deck rigidly secured to the walls of the tank and beneath said roof to form an air chamber between said deck and said roof, conservation valves in the said roof, a baffled opening in said deck whereby the vapors in said tank will be held below said deck and the expanding air may pass from said air chamber under the roof to the atmosphere.

3. A storage tank for liquids comprising the usual sides and bottom, an upwardly extending roof sealing said tank, said roof provided with pressure and vacuum valves therein, a deck immovably secured within the tank and means for supporting the same, said deck having an opening therein, and a baffle plate above said opening, the height of the baffle plate from the opening being approximately the diameter of the opening whereby the gaseous vapors will not diffuse and the air in the chamber above the deck may pass to the atmosphere.

4. A storage tank for gasoline and other volatile hydrocarbons, said tank comprising sides and a bottom, means for supporting a roof, and a roof on said means, said roof provided at its uppermost portion with conservation valves, a metal deck supported within the tank and rigidly secured near the upper edge of the side walls of the tank to thus form an air chamber between the deck and said roof, said deck provided with a baffled opening to permit the air in the tank to pass up into said chamber and retain the vapors below said deck, and the conservation valves allowing the ingress and egress of air from said expansion chamber.

5. A storage tank for petroleum products comprising the usual side walls and bottom, said tank provided with the usual inlets and outlets, a top rail on said walls, rafters for supporting a roof, said rafters secured to said top rail, a roof sealing said tank and supported by said rafters, a peripheral rail spaced beneath the first rail, columns extending upwardly from the bottom of the tank, a deck supported by said columns and by said second mentioned rail, said deck provided with a central opening and a baffle plate above said opening, conservation valves in the roof, the space between the roof and the deck forming a chamber for the expanding and contracting air and the said deck adapted to prevent the vapors from passing up into said expansion chamber.

6. A storage tank for liquids having a roof and a deck beneath the roof to form an air expanding chamber, means in the deck for allowing air to escape from the body of the tank to said expansion chamber and prevent the heavier vapors from passing up into said chamber, means in the roof for allowing the expanding air to pass to the atmosphere and also permitting air to pass into the expansion chamber as the air within said chamber is cooled.

In testimony whereof I affix my signature.

JOHN F. PATTERSON.